Patented Jan. 6, 1953

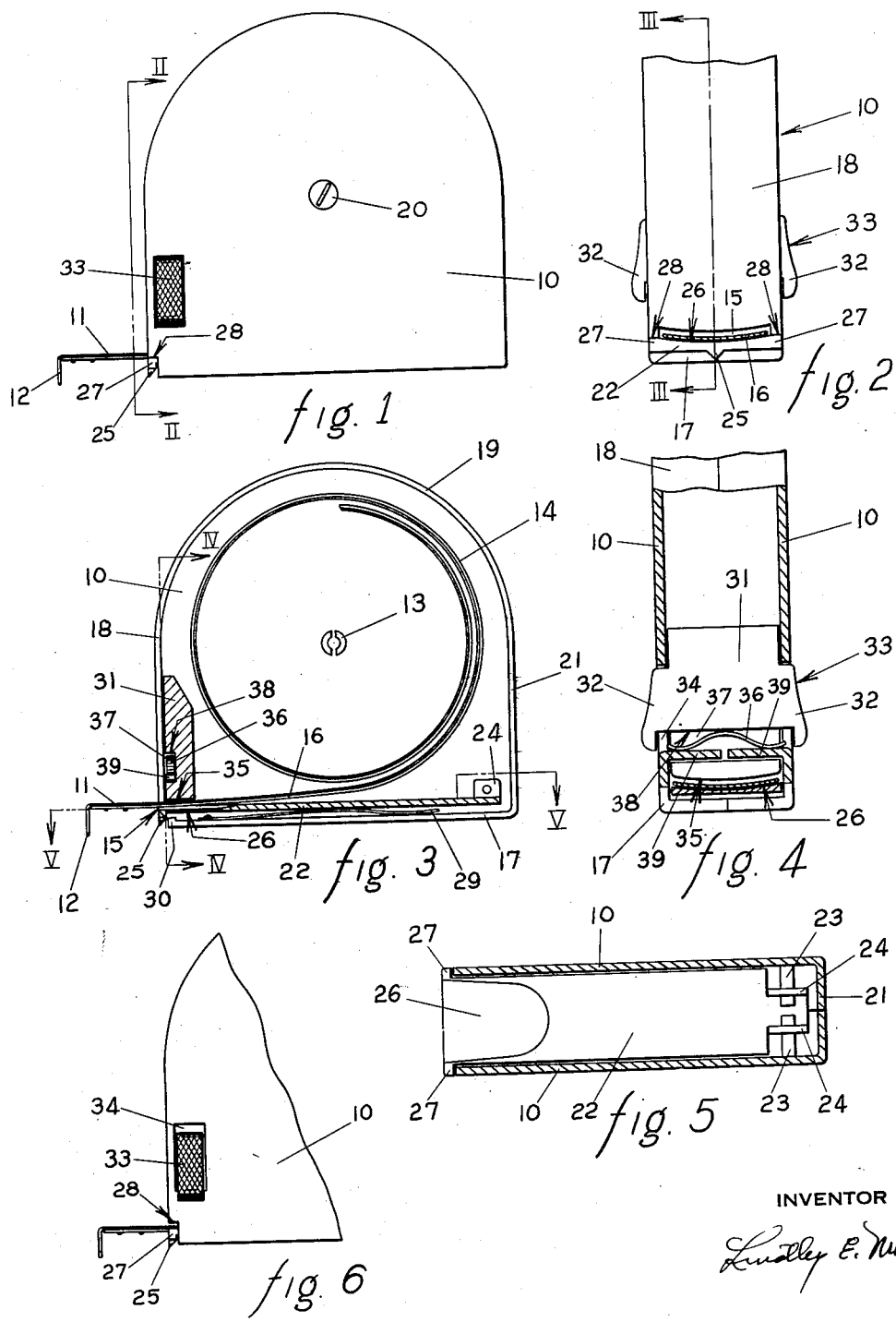
Jan. 6, 1953 L. E. MILLS 2,624,120
MEASURING DEVICE
Filed May 4, 1949

2,624,120

UNITED STATES PATENT OFFICE 2,624,120

MEASURING DEVICE

Lindley E. Mills, Kalamazoo, Mich.

Application May 4, 1949, Serial No. 91,313

8 Claims. (Cl. 33—138)

This invention relates to a measuring device, particularly to a flexible measuring tape adapted to be coiled in a case when not in use and to an improved case therefor.

The use of a flexible measuring tape, usually a thin strip of resilient tempered steel or other suitable metal, which is normally coiled, often under spring tension, within a case and which can be retrievably withdrawn through an opening in the front edge of the case for use, is widespread among carpenters, plumbers, masons, householders and other workers. As generally constructed such tapes are transversely concave on one side, usually on the top, and convex on the other and are frequently referred to as "concavo-convex" tapes or ribbons. Such a tape made of a good grade of tempered steel tends, when not restrained, to straighten and flatten itself longitudinally along a flat surface and thus makes a very convenient measuring device. Flat tapes, rather than tapes which are concavo-convex, have also been employed in similar fashion. Due to the flexible nature and thin cross-section of such tapes, they can be spring-tensioned and coiled in known manner in a small case for storage when not in use.

Such conventional flexible tape and case combinations suffer, however, from certain defects, one of which is the tendency of the tape to "creep" into or out of the case while the user is noting a measurement or securing and using a pencil or other marking instrument to mark off a measured distance on the work. Numerous devices and modifications have been proposed for locking the tape in a desired extended position. These devices have assumed various forms familiar to those conversant with the art. They are, however, all characterized by the necessity of operating an actuating member, such as a lever or transversely movable push button, on the outside of the case, which operation usually requires the use of two hands. Such actuating members as have heretofore been provided are awkward to manipulate and cannot generally be operated while holding the tape in an extended position along the work with one hand and the case with the other hand. Generally speaking, in using tapes in cases equipped with either a lever or a punch button actuated type of mechanism it is necessary to lock the tape in a desired extended position prior to locating it on the work and, after the work has been scribed or marked or after a desired measurement has been taken, to remove the tape from the work prior to unlocking it.

Furthermore, such devices do not eliminate the necessity of using a pencil or other instrument in one hand to mark or scribe the work and thus leave only one hand free to hold the tape or case while marking off a desired distance on the work. It has been suggested to affix a scriber point at a convenient location on the outside of a case for a flexible measuring tape, but this is unsatisfactory because the scriber point is prone to scratch other tools in a tool box and to tear clothing and it invariably soon becomes dulled and bent so as to be substantially worthless. Furthermore, when on the outside of the case in an exposed position it is seriously in the way when it is not desirable to scribe the work. It is apparent that any improvement in cases for flexible measuring tapes which would overcome these and other difficulties and which would permit automatic locking of the tape during normal operation of the device and which would also automatically release the tape when the need for having it locked has passed would be of value. The need for improved scribing means in combination with such a case is also apparent.

It is, therefore, an object of the present invention to provide a flexible tape and a case therefore having a mechanism for locking the tape in an extended position.

An additional object is to provide a case for a flexible measuring tape including means for locking the tape in an extended position which can be operated easily and positively with one hand during normal use of the device.

An additional object is to provide means for locking a flexible tape, normally coiled in a case, in an extended position which can be operated by moderate pressure downward so as to eliminate any tendency for the case to slide on the work during the locking operation.

An additional object is to provide a case for a flexible tape having a mechanism for locking a tape in an extended position which mechanism automatically releases the tape when the need for having the tape locked has passed.

An additional object is to provide a case for a flexible tape having cooperating scribing means and locking means for the tape characterized by exposure of the scribing means in a scribing position only when the tape is locked and by automatic withdrawal of the scribing means into a non-exposed, non-scribing position during the time the tape is not locked.

Other objects will be apparent as the description proceeds.

To the accomplishment of the foregoing and releated ends, the invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

The invention can be better understood by reference to the accompanying drawing wherein, in the interest of clarity, certain features are shown on a somewhat exaggerated scale and wherein:

Figure 1 is a side elevation of a case containing a coiled, flexible measuring tape and embodying features of the invention, Figure 2 is a front elevation taken along the line II—II of Figure 1, Figure 3 is a side sectional elevation taken along the line III—III of Figure 2, Figure 4 is a partial front sectional elevation taken along the line IV—IV of Figure 3.

Figure 5 is a vertical sectional view taken along the line V—V of Figure 3, and

Figure 6 is a partial side elevation corresponding to Figure 1 but with certain of the working parts in a displaced position.

For convenience in nomenclature, the walls of the case lying in planes parallel to the plane of the coiled tape within the case are herein referred to as "side members," the edge of the case which, when the device is used, is normally placed in contact with a surface of the work along which a measurement is to be taken is referred to as the "bottom edge member" or "base member," the edge member opposite the base member, which is often arcuate, is referred to as the "top edge member" and the edge members extending substantially between the ends of the top edge member and the base member are referred to as the "front edge member" and the "rear edge member," respectively, the withdrawal port for the tape being in or adjacent to the lower end of the member referred to as the "front edge member." The edge members thus extend between the peripheries of the side members and often serve to join and space the side members. The terms "downward," "forward," "upward" and "rearward," and their equivalents, refer, accordingly, to directions from a reference point inside the case toward the base member, the front edge member, the top edge member and the rear edge member, respectively. The several movable members of the case are referred to as being in their "normal" positions when they are in the positions, which will hereinafter be apparent, normally assumed by them in response to the urgings of the respective spring tensioning means with the case at rest. The term "case" as used herein includes the entire device except for the flexible tape and a conventional tape-retrieving spring.

Referring to the several figures of the drawing, wherein like reference numerals refer to like parts, there is shown a flexible measuring tape and a case therefor, both of substantially conventional design except as hereinafter described. The particular case shown is preferably formed by a die casting operation and the invention will be described with particular respect thereto, but it is understood that the invention is not limited thereto and that the features of the invention can be incorporated as well in cases formed by pressing or stamping operations or by molding of a plastic substance, if desired. The particular case illustrated is also shown as formed in two matching halves, the edge members being formed in two substantially equal portions each of which is formed integral with a respective side member, but it is understood that the invention is not limited thereto and that the features of the invention can be included in cases formed in any other way.

In the modification illustrated, a conventional flexible measuring tape 11 with a conventional hook 12 on the withdrawable end thereof is shown partially coiled in a case, e. g. as at 14 of Figure 2, around a center post or drum 13. A spring, not shown, for retrieving and coiling the tape is usually provided, one end of which is secured to the center post 13 and the other end of which is secured to the inner end of the tape. An uncoiled section 16 of the tape inside the case extends between the coiled section 14 and the withdrawal port 15. The case includes side members 10, a base member 17, a forward edge member 18, a top edge member 19 and a rear edge member 21. The assembled device is held together in any convenient way, as by a screw 20 of Figure 1 which extends through a centrally located hole in one of the side members and is turned into a threaded hole in the center post 13, the post in turn being permanently secured to the inner surface of the other side member. Conventional pins and corresponding sockets, not shown, can be formed integral with the side members to prevent rotation of one side member with respect to the other.

An elongated member 22 is provided and positioned inside the case below the tape. The member is pivoted at its rearward end, preferably near the rear edge member 21 of the case so as to minimize its angle of rotation per unit distance of travel of its forward end. The member 22 is pivoted so that its plane of rotation is parallel with the planes of the side members 10 and also with the plane of the coil of tape within the case. The member 22 can be pivoted in any convenient way, as on a pair of pins 23 of Figure 5 formed integral with or secured to the side members 10 and extending through holes in a pair of flanges 24 secured to the rearward section of the member 22. The main body of the member 22 is generally, but not necessarily, in the form of a thin flat strip which fits easily inside the case and is guided in its rotational travel and prevented from undue side play by the side members 10 of the case. The member 22 is preferably located so that in its normal position it lies substantially parallel with and removed by a short distance from the base member 17.

The forward end of the elongated member 22 is formed with a downwardly projecting scriber point 25 secured thereto, preferably in line with the forward or outer surface of front edge member 18 of the case so that the location of the scriber point on the work with respect to the position of the tape can be determined by noting the reading on the upper surface of the tape which is in direct line with the forward edge of the case. A lower tape-braking surface 26 is located on the upper surface of the forward section of the elongated member 22 and can, if desired, be formed with a slightly concave surface conforming substantially to the transverse curvature of the tape. The lower tape-braking surface 26 can, however, and with entire satisfaction, be merely the flat upper surface of the forward section of the member 22. The member 22 is generally formed with its forward end substantially even with the forward edge of the front edge member 18.

Means are provided for limiting the extent of rotation of the elongated member 22 in the upward direction, i e. in a direction toward the tape, to prevent the lower tape-braking surface from pressing unduly against the tape when such pressure is not desired. This can be accomplished readily by providing a short lateral projection or pin 27 on each side of the forward end of the member 22, each of which bears upward against a shoulder 28 formed in the front edge member of the case. The shoulders conveniently form the ends of the withdrawal port 15 through which the tape 11 can be withdrawn from the case, the member 22 thus forming the lower edge of the port 15 when the pins 27 are in contact with the shoulders 28. The upper edge of the withdrawal port 15, in the modification illustrated, is formed by the lower end of the front edge member 18, except for the somewhat longer side portions forming the shoulders 28 referred to, and is preferably straight or curved to correspond with the contour of the lower tape-braking surface 26.

The elongated member 22 is normally maintained, e. g. by the urging of a leaf spring 29 positioned between the member 22 and the base member 17, or by other suitable spring means in its normal position wherein the pins 27 are held against the shoulders 28. The length of the scriber point 25 and the limit of rotation of the member 22 downward, i. e. rotation in a direction away from the tape, are preferably adjusted so that, when the member 22 is in its normal position, the point 25 does not project below the plane of the lower surface of the base member 17 and is thus in a protected non-scribing position, but so that when the member 22 is rotated downward to the limit of its travel the scriber point 25 projects below the plane of the lower surface of the base member 17 and is thus in a projected or exposed position suitable for scribing. The rotation of the member 22 downward is limited in any convenient way to keep the scriber point 25 from projecting more than a desired distance below the plane of the lower surface of the base member 17. In the modification illustrated, this occurs when the spring 29 is flattened between the elongated member 22 and the base member 17 or, alternatively, when the member 22 contacts a slightly elevated projection 30 which can be formed on the forward end of the base member 17. The elevated projection 30 additionally serves to close more completely the opening between the forward ends of the members 22 and 17 and prevents the entry of dirt into the case.

To effect compressive contact of the uncoiled section 16 of the tape within the case with the lower tape-braking surface 26 and to cause projection of the scriber point 25 into a scribing position, a slider 31 is positioned inside the case adjacent the front edge member 18 thereof which is adapted to slide vertically between the side members 10. A projection 32, preferably knurled or otherwise formed on its outer end surface as at 33 to facilitate holding with a finger or thumb, is provided on each side of the slider 31 and is adapted to travel in a vertical slot 34 formed in the side member 10 of the case. The slot 34 serves to guide and limit the travel upward of the slider 31.

The lower end of the slider 31 is provided with an upper tape-breaking surface 35 which is preferably shaped to conform with the contour of the lower tape-breaking surface 26 and to cooperate therewith when the slider is slid downward to grip the tape and retard or arrest completely its longitudinal movement between them. Means of any convenient sort are provided to urge the slider 31 upward to the limit of its travel when not in use so as to prevent its contacting the tape unduly when the latter is being withdrawn from or retrieved into the case. One such suitable means includes a small leaf spring 36 positioned in a transverse groove or channel 37 formed in the forward face of the sliding member 31 so as to bear upwardly against the upper side 38 of the groove and downwardly against a fixed member of the case, such as a pin or pins 39 formed integral with or secured to the inside of one or both of the side members 10 immediately below the lower edge of the slots 34 and positioned to project into the lower part of the groove 37.

To operate the measuring device described, the case is placed upon the work surface in conventional manner with the base member in contact therewith, the case being held in one hand by gripping the knurled surfaces 33 between the thumb and forefinger. The desired length of tape is then withdrawn from the case with the other hand. Upon pressing downward lightly with the hand holding the case, the slider 31 moves downward against the light tension of the slider tensioning spring 36 and the tape is gripped firmly between the upper and lower tape-breaking surfaces. The tape can then be released for marking the work without fear of the tape creeping as long as downward tension is maintained on the case. Should it be desired to scribe the work, the downward pressure on the case is increased slightly to compress the scriber tensioning spring 29 and contact the scriber point with the work and the entire case then moved a short distance sideways whereupon the work is scribed. Upon lifting the case from the work, the elongated member 22 and the slider 31 are returned to their normal positions in response to the urgings of their respective tensioning springs, the scriber point thus being automatically returned to its withdrawn or protected non-scribing position and the tape automatically released or unlocked.

Although one particular modification of the invention has been described in detail, the invention is not limited thereto but contemplates in its broadest aspects a case for a flexible measuring tape having a pair of tape-breaking surfaces positioned within the case and normally spaced from one another, and so arranged that, in response to pressure designed to press the case downward on a surface, the tape is gripped or locked between the two tape-breaking surfaces and its longitudinal movement retarded or prevented and, by relieving the pressure of the case downward on the surface, the tape is automatically released. In a preferred modification, a scriber point is also provided in a suitable location such that it is normally in a retracted non-scribing position but arranged so that, in response to the downward pressure mentioned, it is projected into an exposed scribing position and, when the pressure is relieved, it is returned automatically to its normal non-scribing position. It is also preferable, but not essential, that projection of the scriber point into a scribing position follows the locking of the tape and that retraction of the scriber point into its normal non-scribing position precedes the unlocking or release of the tape when the downward pressure on the work surface is relieved.

Although the upper and lower tape-breaking surfaces 35 and 26 are usually formed of metal, they can, if desired, be formed of rubber, cork, synthetic resin or of any other suitable material to obtain a desired degree of frictional contact between the surfaces and the tape or to avoid surfaces which may scratch the tape.

I claim:

1. In a case for a flexible tape, the combination including: a pair of tape-braking surfaces positioned within the case and normally spaced from one another; and a vertically slidable member associated with one of the surfaces having a lateral projection integral therewith traveling in a vertical guide slot in a side of the case and adapted when slid downwardly to cause the tape-breaking surfaces to grip a section of a tape within the case between them to retard its longitudinal movement.

2. In a case having a flexible tape normally coiled therein, the combination including: a lower tape-breaking surface positioned within the case below an uncoiled section of the tape; an upper tape-breaking surface positioned above the tape opposite the lower tape-breaking surface and normally spaced therefrom by a distance greater than the thickness of the tape; and a vertically slidable member associated with the upper surface having a lateral porjection integral therewith traveling in a vertical guide slot in a side of the case and adapted when slid downwardly to cause the upper tape-breaking surface to move toward the lower tape-breaking surface to grip the tape between the two surfaces to retard its longitudinal movement.

3. In a case for a flexible measuring tape, the combination including: a pair of tape-braking surfaces positioned within the case and normally spaced from one another; a scriber point normally positioned in a retracted non-scribing position; and a vertically slidable member associated with one of the surfaces adapted when slid downwardly to cause the tape-braking surfaces to grip a section of a tape within the case between them and the scriber point to move into a projected scribing position.

4. In a case for a flexible tape, the combination including: a pair of tape-braking surfaces positioned within the case and normally spaced from one another; a scriber point secured to a member of the case and normally in a retracted non-scribing position; and a vertically slidable member associated with one of the surfaces adapted when slid downwardly to cause first the tape-braking surfaces to grip a section of a tape within the case between them and, subsequently, to cause the scriber point to be projected into a scribing position.

5. A case as claimed in claim 4 including spring means to release the tape and return the tape-braking surfaces and scriber point to their normal positions automatically upon relief of the pressure of the case on the work surface.

6. In a case for a flexible measuring tape, the combination including: a lower tape-braking surface positioned within the case adjacent to and beneath an uncoiled section of a tape within the case; a slider positioned above the tape and having at its lower end an upper tape-braking surface opposite the lower tape-braking surface; means to guide the slider in a path substantially vertical to the base member of the case; means to limit the travel of the slider upward to its normal position such that the upper tape-braking surface is spaced from the lower tape-braking surface by a distance greater than the thickness of the tape; and holding means secured to the slider and projecting through the side members of the case whereby the case can be grasped and pressed downward on a work surface to cause the slider to slide downward in the case and the tape to be gripped between the upper and lower tape-braking surfaces.

7. A case as claimed in claim 6 including means to release the tape and return the slider to its normal position automatically upon relief of the pressure of the case on the work surface.

8. In a case for a flexible measuring tape, the combination including: an elongated member positioned within the case pivoted at its rearward end and having at its forward end a lower tape-braking surface on its upper surface and a scriber point secured to its lower surface, the elongated member being adapted to rotate about its pivot in a plane substantially parallel with the side members of the case; means to limit the rotation of the elongated member in an upward direction to its normal position such that the lower tape-braking surface is adjacent an uncoiled section of a tape within the case and the scriber point is in a retracted non-scribing position; means to limit the rotation of the elongated member in a downward direction to a scribing position such that the scriber point is in a projected scribing position; spring means to resist rotation of the elongated member from its normal position; a slider positioned above the tape having at its lower end an upper tape-braking surface opposite the lower tape-braking surface; means to guide the slider in a path substantially vertical to the base member of the case; means to limit the extent of the upward travel of the slider to its normal position such that the upper tape-braking surface is spaced from the lower tape-braking surface when the latter is in its normal position by a distance greater than the thickness of the tape; and spring means to resist sliding movement of the slider from its normal position.

LINDLEY E. MILLS.

REFERENCES CITED

The following references are of record in the file of this patent:

UNITED STATES PATENTS

| Number | Name | Date |
|---|---|---|
| 812,322 | Badger | Feb. 13, 1906 |
| 2,132,202 | Carlson | Oct. 4, 1938 |
| 2,347,273 | Lyle | Apr. 5, 1944 |
| 2,446,020 | Nicholson et al. | July 27, 1948 |

FOREIGN PATENTS

| Number | Country | Date |
|---|---|---|
| 253,421 | Great Britain | June 17, 1926 |
| 607,177 | Great Britain | Aug. 26, 1948 |